United States Patent [19]
Lofgren et al.

[11] Patent Number: 4,789,173
[45] Date of Patent: Dec. 6, 1988

[54] STEERING METHOD AND MECHANISM FOR THREE-WHEEL VEHICLE

[76] Inventors: Michael S. Lofgren; Brian C. Stewart, both of 20589 SW. Elk Horn Ct., Tualatin, Oreg. 97062

[21] Appl. No.: 132,925

[22] Filed: Dec. 15, 1987

[51] Int. Cl.⁴ .............................................. B62K 5/04
[52] U.S. Cl. .............................. 280/281 LP; 280/282
[58] Field of Search ........................... 280/282, 281 LP

[56] References Cited
U.S. PATENT DOCUMENTS 4,432,561  2/1984  Feikema et al. ............... 280/281 LP
4,572,535  2/1986  Stewart et al. ................ 280/281 LP Primary Examiner—David M. Mitchell
Assistant Examiner—Donn McGiehan
Attorney, Agent, or Firm—Robert L. Harrington

[57] ABSTRACT

A three-wheel vehicle having front and rear frame sections supporting a single front wheel and a pair of rear wheels respectively. The frame sections are pivotally interconnected about an inclined axis defined by a front lower and rear upper pivotal connection. The upper pivotal connection is provided on a swivel bar which is pivotally connected to the rear frame section for swivel pivoting of the pivotal connection defining the inclined axis. A seat on the front frame section positioned substantially above the swiveled pivotal connection is shifted from side-to-side with the pivoting of the swivel bar and inclined axis. A handle from the swivel bar enables a rider to control the swivel bar for shifting of the rider's weight and increased or decreased articulation of the vehicle frame and thus turning of the vehicle to thereby increase or decrease the turning that is induced by pivoting of the front frame section about the inclined axis.

7 Claims, 4 Drawing Sheets

STEERING METHOD AND MECHANISM FOR THREE-WHEEL VEHICLE

FIELD OF INVENTION

This invention relates to a three-wheel vehicle having independent front and rear frame sections that are pivotally interconnected by front and rear pivots, and more particularly to the inclusion of an intermediate swivel for the rear pivot that enables increased turning control.

BACKGROUND OF THE INVENTION

Three-wheel vehicles based on the concept of articulated frame sections, i.e. a front frame section being pivotable about a rearwardly inclined axis relative to a rear frame section for turning the vehicle, is known, as exemplified by the U.S. Pat. No. 4,572,535 issued to the same inventors hereof. The vehicle of this U.S. Patent functions very well for its intended purpose. However, it is desirable to provide a three-wheel vehicle on which the rider can sit more upright and at a higher position on the vehicle, thus providing a more natural bike-riding position and also giving the rider greater visibility. It is also desirable to increase control over the maneuverability of the vehicle. The invention herein is directed to the satisfaction of both these objectives.

BRIEF DESCRIPTION OF THE INVENTION

The present invention solves both of the above objectives. Whereas in the prior vehicle, the rear pivot for the front frame section was provided directly on the rear frame section, thus restricting the control over turning, the preferred embodiment of the present invention provides this connection through a swivel member or short lever. The swivel member is projected downwardly and forwardly from an upper pivotal connection on the rear frame member. The rear pivot of the front frame section is pivotally connected to the swivel member spaced from and below the pivotal connection to the rear frame section. The swivel member swivels from side-to-side relative to the rear frame section and in so doing, displaces the rear pivot or the front frame section from side-to-side.

A handlebar is provided on the swivel member at the lower end thereof. The handlebar enables the rider to facilitate the swinging of the swivel member to either side. The rider sitting in a seat attached to the front frame section can turn the vehicle to the right by leaning to the right, causing pivoting of the front frame section about its inclined axis. Such pivoting causes turning of the front wheel to the right. Forcing the swivel to the left during this turning process skews the front frame section further in a rightward direction and causes increased turning of the front wheel for a sharper turn. Forcing the swivel to the right in the same turning situation decreases the turn.

It will be appreciated that the rider has control over the sharpness of the turn and a corresponding shifting of his weight by maneuvering the handle attached to the swivel member. If the vehicle is travelling quite fast, the rider wants to shift his weight toward the inside wheel when making a turn to increase the moment arm, thereby countering the centrifugal force that induces tipping. In doing so, the turning angle of the front wheel is decreased to lessen the sharpness of the turn. Conversely, when at a slow speed, i.e. when centrifugal force is not a problem, a much sharper turn can be created by shifting the swivel lever toward the outside wheel. This results due to increased articulation between the front and rear frame sections.

This ability to controllably swing the rear pivot of the front frame section as desired by the rider, enables the provision of an elevated seat while achieving substantial stability. Such elevated positioning of the seat improves the rider's comfort and visibility.

The invention will be more clearly understood and appreciated by reference to the detailed description that follows and the accompanying drawings referred to therein.

BRIEF DESCRIPTION OF THE DRAWINGS

Referring to FIGS. 1 and 2, a front frame section includes front wheel straddle bars 10 and 12, that straddle the front wheel 14. Brackets 18 and 20 mounted on the bars 10 and 12 rotatably support the hub bolt 22 and thereby the wheel 14. A sprocket bearing 16 is mounted to the front ends of bars 10,12 which in turn support pedals 15 that rotate sprocket 24. A chain 19 connects the sprocket 24 to the front wheel hub for driving the front wheel 14. Straddle bars 10,12 extend rearward of the front wheel at a slightly downward angle and then bends upwardly at a desired angle of about 30 degrees.

Figure 1:
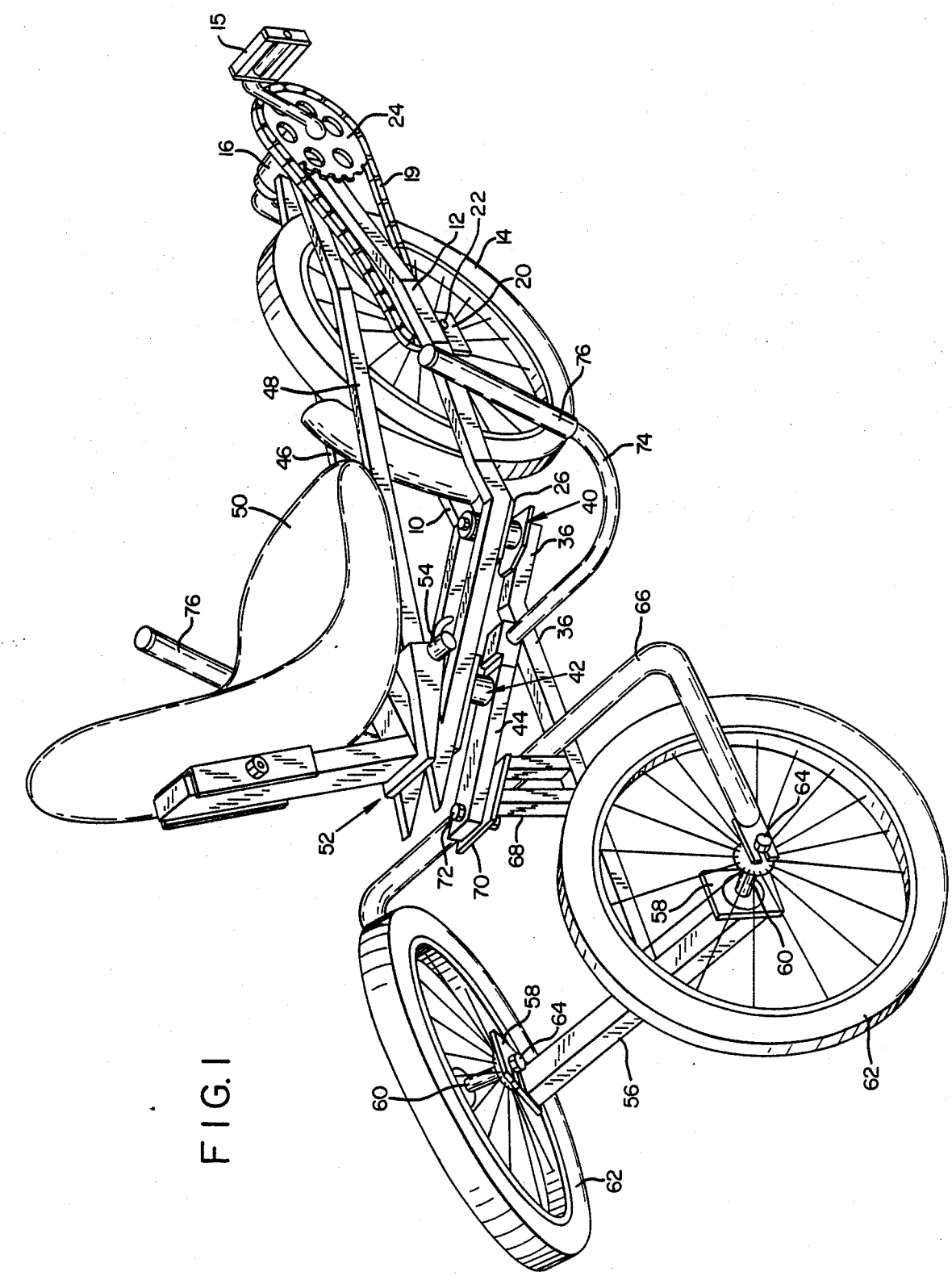
FIG. 1 is a perspective view of a three-wheel vehicle in accordance with the present invention.

Just rearward of the bend is a plate 26 secured to the bottom of both bars 10,12. A hole through the plate 26 receives a bolt 28. The bolt 28 extends through a washer 30, through a thick rubber grommet 32, then through plate 26, then through a lower rubber grommet 34, and finally through the forwardly projected end of the rear frame section 36. A nut 38 is screwed onto the bolt end to secure the above components in this stacked arrangement. This arrangement is hereafter referred to as the front pivot 40.

The straddle bars 10,12 extend from the position of pivot 40 upwardly to a second pivot 42 similarly comprised of a plate 26 sandwiched between upper and lower rubber grommets 32,34, with a bolt extending through a washer 30, and then down through the plate grommets. However, rather than direct connection to the rear frame, pivot 42 attaches the bars 10,12 to a swivel bar 44, which will be discussed in more detail later. The straddle bars 10,12 terminate just above pivot 42. A pair of seat-support bars 46,48 are joined to the straddle bars 10,12 at the upper end and extend back over and around the front wheel 14 where they are connected to bearing housing 16.

A molded seat 50 is fixed to a mounting bracket 52 for mounting the seat to the support bars 46,48. The seat is adjustable along the bars 46,48 by a sliding engagement of bracket 52 which is lockable at a desired position by a lock screw 54.

Reference is now made to the rear frame section which includes a crossbar 56 extended between mounting plates 58 at each end. Hub bolts 64 for the hubs 60 of rear wheel 62 are attached to the mounting plate 58 at the inside of the wheel 62, and to the respective ends of a U-bar 66 on the outside of the wheel 62. Bar 36 extends rearwardly from pivot 40, under U-bar 66 and is joined at its opposite end to the mid-point of crossbar 56.

At a position on bar 36, just behind U-bar 66 and substantially below the juncture of straddle bars 10,12 with seat-supporting bars 46,48, is support post 68 including an inclined upper bearing plate 70. Swivel bar 44 extends from pivot 72 on the bearing plate 70, along the incline which coincides with the upwardly angled portion of bars 10,12. Swivel bar 44 extends along the bars 10,12 but spaced below the bars, to terminate at an end portion that supports a U-shaped handlebar 74 having handle grips 76. Intermediate of the pivot 72 and handlebars 74 is the pivotal connection 42 between the bars 10,12 and swivel bar 44.

OPERATION

Figure 3:
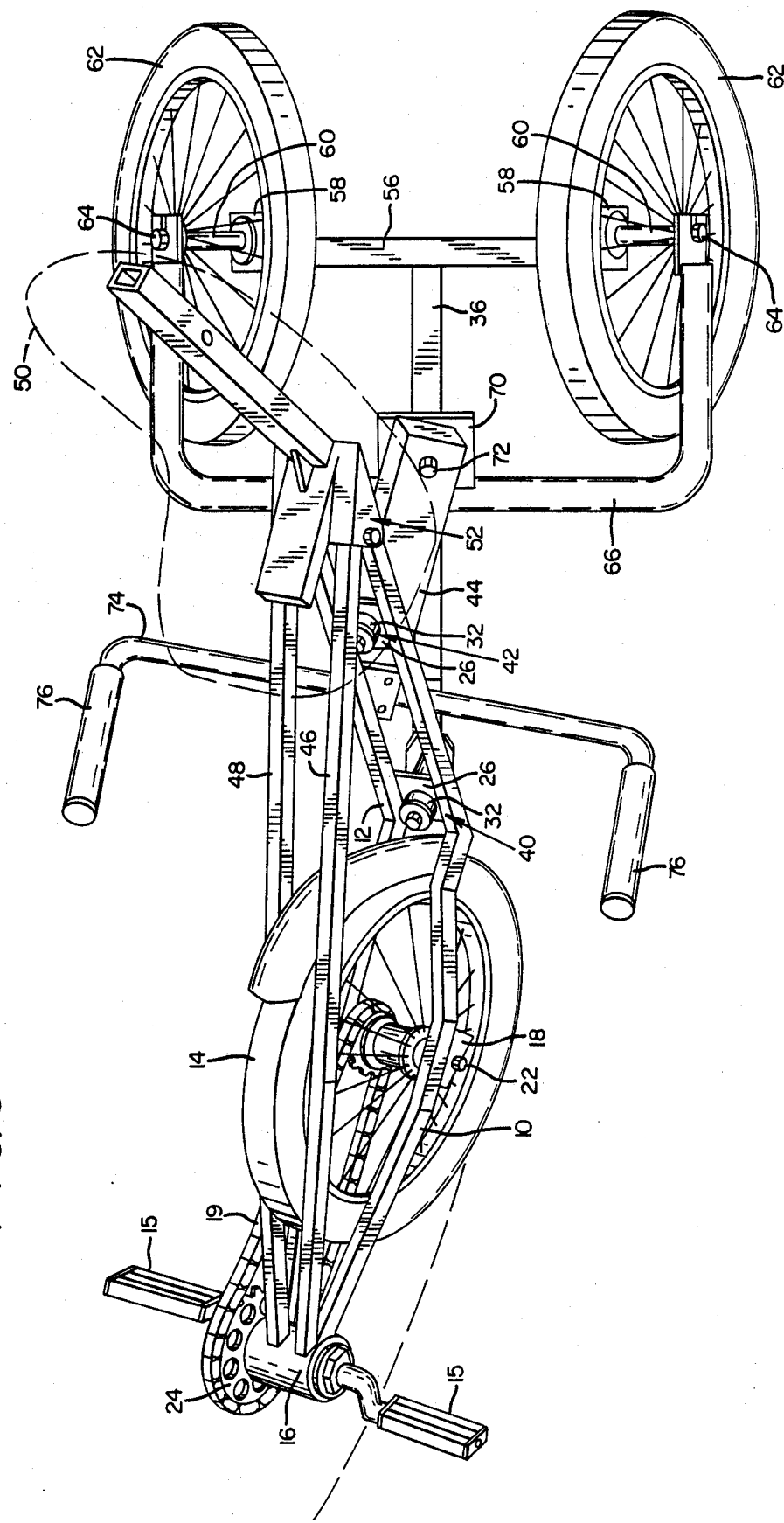
FIG. 3 is a top view of the vehicle of FIG. 1 illustrating the vehicle in a right turn with the front frame section swiveled to the right for decreased turning.
Figure 4:
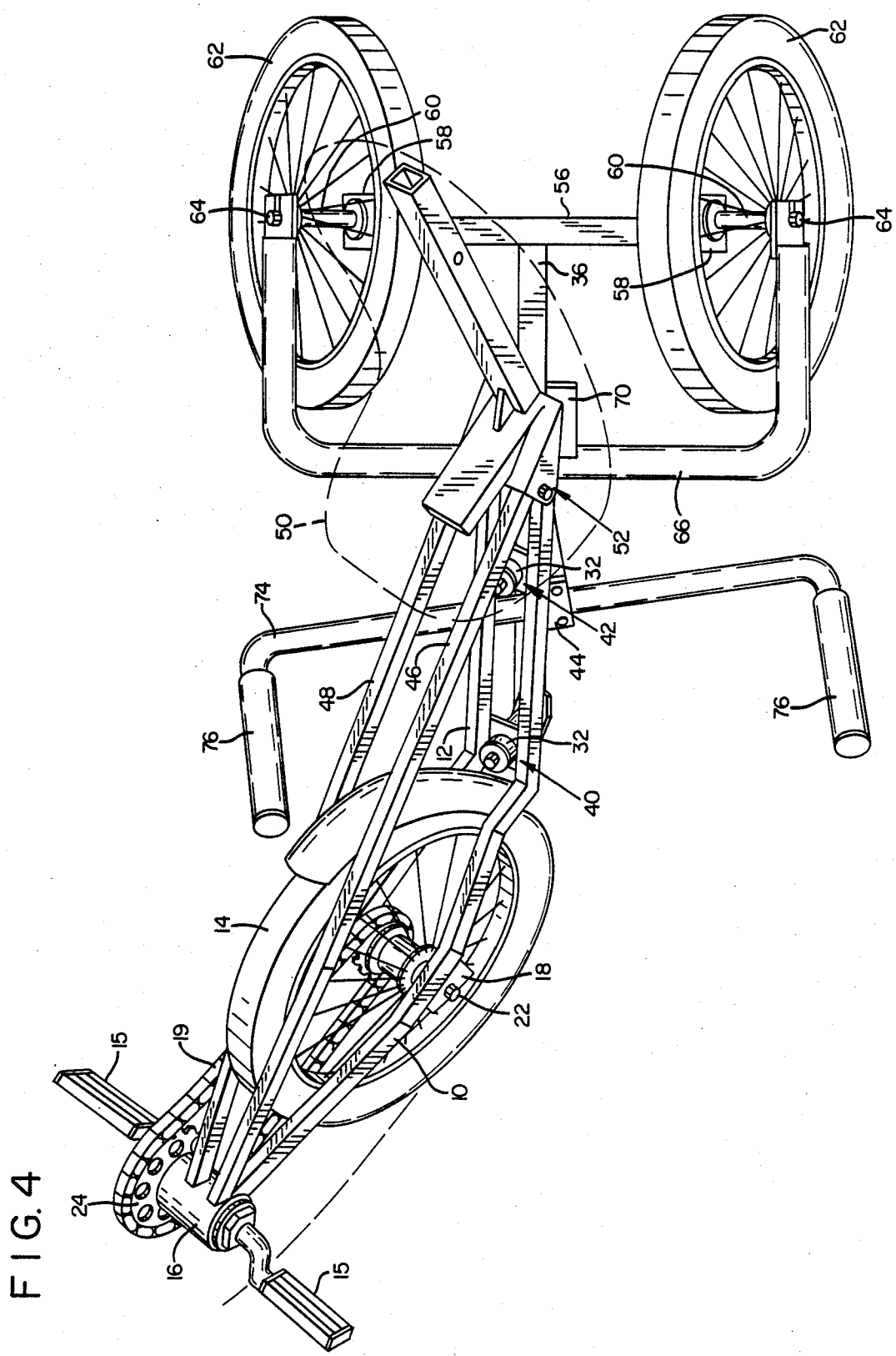
FIG. 4 is a top view of the vehicle similar to that of FIG. 3 but illustrating the vehicle in a right turn but with the front frame section swiveled to the left for increased turning.

Reference is now also made to FIGS. 3 and 4 illustrating the turning motion of the vehicle. It will be appreciated that the seat 50 is shown in dash line for illustration purposes in FIGS. 3 and 4. It will also be appreciated that a rider sits in the seat 50 supported on bars 46,48 with the rider's feet engaging pedals 15 for driving the front wheel and thus the vehicle. Obviously, adjustment of bracket 52 along the bars 46,48 enables adjustment to different riders' leg length. The rider's hands grip handle grips 76 of handlebar 74.

Turning of the vehicle to the right is initiated by the rider leaning his upper body to the right as viewed in FIG. 3. This leaning action induces pivoting of the front frame section about an inclined pivotal axis 80 indicated in FIG. 2. This axis generally follows the incline of the upwardly angled portion of bars 10,12, i.e. at about a 30 degree incline to the horizontal or ground contact 78. It will be noted that the axis 80 runs through bolts 28 just above the bar 36 at the front pivot and above the bar 44 at the rear pivot. As will become apparent, the pivoting of the front frame section about axis 80 causes a relative twisting action of the pivots 40,42 as permitted by the tolerance or play built into the elongated bolts 28 and rubber grommets 32,34. Accordingly, axis 80 cannot be considered a true fixed axis. It is perhaps more accurately defined as a shifting axis in the region between the two frame sections.

Figure 2:
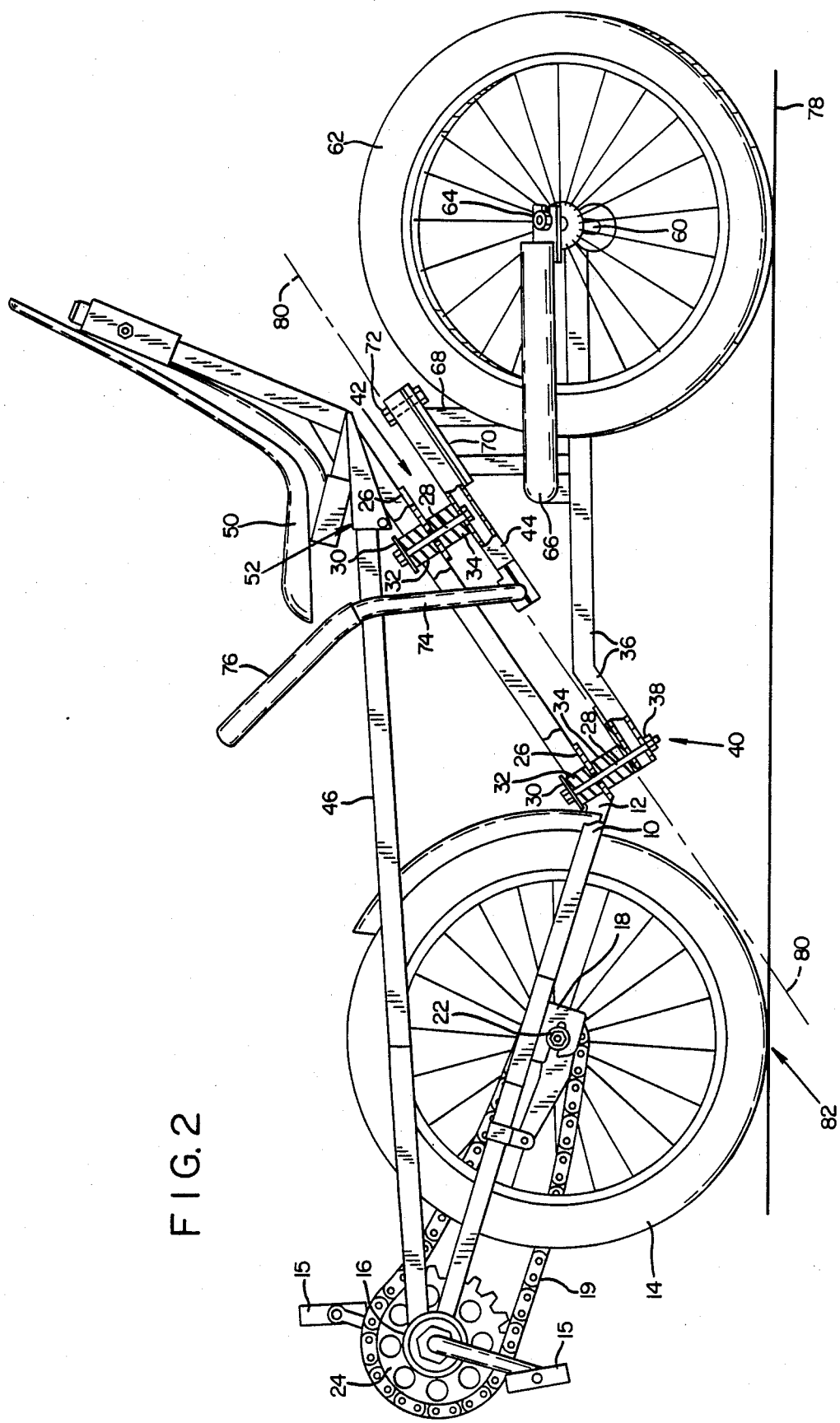
FIG. 2 is a left-side view of the vehicle of FIG. 1 but shown partially in section.

The pivotal movement of the front frame section is controlled in part by the contact of the front wheel on the ground 78, i.e. contact point 82 in FIG. 2. The pivoting of the front frame section forces the front wheel 14 to tip in a manner dictated by the pivotal axis 80 and control point 82. That is, the front wheel 14 is skewed to the right as viewed in FIGS. 3 and 4. Whereas such skewing of the front wheel takes places regardless of the swivel bar 44, i.e. with the swivel bar held in alignment with the rear frame section, the amount of skew can be materially affected by the swivel bar and is the basis of controlled turning as will now be explained.

As will be particularly apparent from FIGS. 1, 3 and 4, side swivel movement, to either side, can be controlled through handlebar 74. The rider's left hand urging the left handle grip 76 forward and down, with the right hand urging the right handle grip 76 backward and up, shifts the swivel bar to the right as viewed in FIG. 3. Shifting the swivel bar 44 to the right also shifts the rear pivot 42 to the right and forces the upper rear end of the entire front frame section to the right. This tends to reduce the turning direction of the front wheel and furthermore shifts the weight of the rider toward the inside or right wheel, i.e. note the position of seat 50 in dash lines of FIG. 3.

Now refer to FIG. 4 wherein the same right-hand turning direction is occurring, but this time with the pivot bar 44 swiveled to the left, i.e. the left hand grip 76 being pulled back and up, and the right hand grip 76 being pushed forward and down. This time the upper end of the front frame section is moved to the left to accentuate the normal turning of the front wheel. A more severe or sharp turn is thus accomplished. Also the rider's weight is shifted to the outside wheel.

In operation, a rider is in control of the turning radius through a combination of leaning into the direction of turn and shifting the swivel bar to the right or left. When the vehicle is traveling relatively fast, the turning radius needs to be restricted and thus a right turn is coupled with a movement of the swivel bar to the right. This also shifts the rider's weight to the inside wheel with a counterbalancing moment arm (lateral distance of the center of gravity from the ground contact of the outside wheel) increased to resist tipping. When traveling relatively slow and tipping is not a concern but achieving a tight turn is desired, the swivel bar is swiveled to the opposite side of the direction of turn thereby increasing articulation.

The invention disclosed herein is believed to substantially improve the usability of three-wheel vehicles. Basically, the concept is dependent on being able to tie the upper pivot to the rear frame section in a manner that enables the shifting of that upper pivot laterally relative to the rear frame section. This side shifting is accomplished for the above-described preferred embodiment with a swivel bar. Other mechanical, shiftable interconnections are believed achievable. One example may be to extend the bearing plate to the sides, probably in a forwardly directed concave curve centered around an axis parallel to the axis 80. A lateral slot in the plate with the pivot 42 guided in the slot should similarly permit swivel side-to-side movement of the upper end of the front frame section. The handlebar can be attached to the rear frame section so as to enable the rider to pull the seat and thus the upper end of the front frame section from side-to-side. The swivel bar 44 may be inverted with post 68 being shorter and moved forward on bar 36. The swivel bar would then be extended rearwardly and upwardly from its pivot 72 to the pivot 42, positioned more rearwardly on support bars 10,12. In any of the above embodiments, the upper pivot is characterized by a connecting element or member connected between spaced positions on the two frame sections. The connecting element permits limited side-to-side shifting of the inter-connected positions which in turn generates an angular shifting of the frame sections about the lower pivot. The selected shifting of this upper pivot in conjuction with the pivoting action provides improved maneuverability for the vehicle.

A further major modification would be to reverse the arrangement with the single turning wheel being at the rear and the two parallelly directed wheels in front. The seat would be reversed as, of course, would the pedal arrangement. In most other respects, the articulation of the frame members would be accomplished in the same manner, with the axis 80 inclined back-to-front.

These and other variations are contemplated as being encompassed by the invention, the specific definition of which is incorporated in the claims appended hereto.

We claim:

1. A three-wheel vehicle comprising; a first frame section and a second frame section, a single wheel rotatably supported on the first frame section, a pair of wheels in spaced-apart relationship rotatably mounted on the second frame section, one of said frame sections being a front frame section and the other a a rear frame section of the vehicle, a first connection means and a second connection means between the first and second frame sections, said first and second connection means defining an inclined axis in the direction from the first frame section to the second frame section, said first and second connection means including pivotal means for relative pivoting of the first and second frame sections about said inclined axis, said second connection means including a connecting element connected between the first and second frame sections at spaced positions thereon, said connecting element having means for controllable lateral shifting of the interconnected spaced positions for relative angular shifting of the two frame sections, and manual control means for controlling said lateral shifting independent of the relative pivoting of the first and second frame sections about said inclined axis.

2. A three-wheel vehicle is defined in claim 1 including a seat mounted to the first frame section to be shifted from side to side relative to the second frame section with relative angular shifting of the two frame sections.

3. A three-wheel vehicle as defined in claim 2 wherein the manual control means is controlled by a rider in the seat.

4. A three-wheel vehicle as defined in claim 3 wherein the connecting element includes a swivel bar having its ends pivotally connected to and extended between the two frame sections at said spaced positions.

5. A three-wheel vehicle as defined in claim 4 wherein a handle is connected to the swivel bar for manual control of the pivoting of said bar.

6. A three-wheel vehicle as defined in claim 5 including a bearing plate under the swivel bar supporting the swivel bar in defining thereby the pivotal plane of the swivel bar.

7. A three-wheel vehicle as defined in any of the claims 1–6 wherein the first frame section is the front frame section and the second frame section is the rear frame section, said front frame section projected forwardly of the single wheel, said single wheel having a hub, a foot pedal means on the forwardly projected portion and drive means connecting the foot pedal means and the hub for manual driving of the single wheel.

* * * * *